(No Model.)

H. R. FRISBIE.
SPINDLE CONNECTION FOR VALVES.

No. 376,981. Patented Jan. 24, 1888.

Attest:
Court A. Cooper,
G. W. Chamberlain.

Inventor:
Henry R. Frisbie
By Chapin &
Atty

UNITED STATES PATENT OFFICE.

HENRY R. FRISBIE, OF DETROIT, MICHIGAN, ASSIGNOR TO WILLIAM BARNETT, OF MANSFIELD, OHIO.

SPINDLE-CONNECTION FOR VALVES.

SPECIFICATION forming part of Letters Patent No. 376,981, dated January 24, 1888.

Application filed April 4, 1887. Serial No. 233,563. (No model.)

*To all whom it may concern:*

Be it known that I, HENRY R. FRISBIE, a citizen of the United States, residing at Detroit, in the county of Wayne and State of Michigan, have invented new and useful Improvements in Spindle-Connections for Valves, of which the following is a specification.

This invention relates to stop-valves, and pertains to improvements in means for attaching the spindles and valves thereof each to the other, whereby the valve proper is permitted to have a rotary motion on the spindle, but can be easily separated therefrom for replacement or repairs; and the invention consists in the peculiar construction and arrangement of the attaching mechanism, all as hereinafter fully described, and pointed out in the claim.

Figure 1:
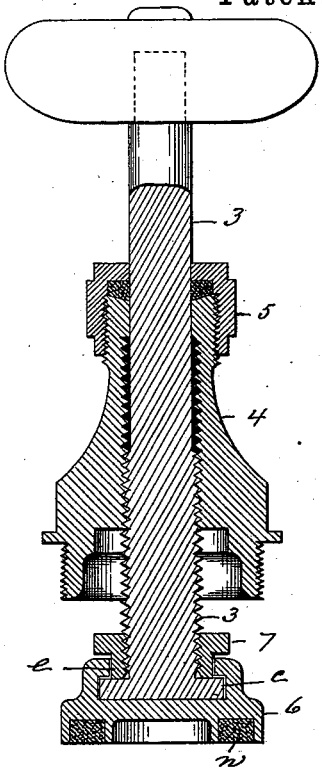
Figure 2:
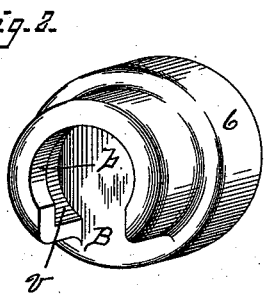
Figure 3:
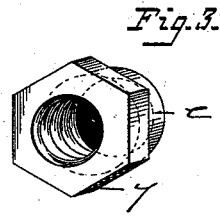

In the drawings forming part of this specification, Figure 1 is a vertical sectional view of the hub of a stop-valve and of a spindle and a valve having applied thereto devices for attaching the valve to the spindle, constructed according to my invention. Fig. 2 is a perspective view of the valve. Fig. 3 is a perspective view of an internally-screw-threaded nut.

In the drawings, 4 indicates the hub of a valve of ordinary construction, having thereon the usual stuffing-box, 5, and internally screw-threaded to receive the correspondingly-threaded valve-spindle 3. The said valve-spindle 3 has an annular collar, $c$, formed on its lower end, and above said collar, on the screw-threaded part of the spindle, is placed a nut, 7, having a cylindrical neck, $e$, thereon, said nut being adapted to be screwed closely against the upper side of the said collar $c$, and to be screwed away from said collar at pleasure. The valve proper, 6, has its under side constructed as usual—that is to say, with an annular groove therein containing a packing substance of vulcanized material or soft metal, which, when forced against the diaphragm of the valve, makes a tight joint; but the upper side of said valve 6 is peculiarly constructed to adapt the valve to be attached to the end of the spindle 3, as below described.

An annular chamber, $v$, is formed in the top of the valve 6, having an overhanging border, $b$; and one side of said annular chamber has a passage cut through it at B, said passage B being of sufficient width to allow the collar $c$ on the end of the spindle 3 to pass through said passage into the chamber $v$ to the position shown in Fig. 1. The diameter of the opening in the top of the valve within the said overhanging border $b$ is considerably greater than the diameter of the threaded part of the spindle 3, and of proper size to admit the neck $e$ of the nut into said opening, which is surrounded by said border.

In assembling the above-described valve parts in complete relation, as shown in Fig. 1, the nut 7 is placed on the spindle first, and then the hub 4 and its stuffing-box are placed thereon, and then the usual hand-wheel is secured to the upper end of the spindle. The valve 6 is then attached to the lower end of the spindle by placing the collar $c$ on the latter in the chamber $v$ of the valve, as above described, and then the nut 7 is screwed down against the upper side of said collar to the position shown in Fig. 1. In so screwing down the nut 7 its neck $e$ is made to project into the annular opening within the overhanging border $b$, and since the diameter of the neck $e$ of the nut is greater than the width of the passage B between the edges of said border, neither the nut nor the spindle can pass laterally between the sides of said passage, and hence the valve and the spindle are securely attached one to the other, but in such a way that the valve may turn freely on the end of the spindle, and vice versa, thereby providing for the desired freedom of movement between said parts with scarcely a possibility of the valve ever becoming accidentally detached from the spindle. The slight rotation of the valve-spindle in the valve when the latter comes to a bearing on the seat of a stop-valve causes a like movement of the nut 7, and, in fact, the rotary movements of the spindle in either direction cause a like movement of said nut, and as the latter is so fitted into the opening in the top of the valve that it does not come in contact with the said border $b$, no danger exists that the nut can work loose and permit the valve and spindle to become disconnected by that means.

What I claim as my invention is—

The improved spindle and valve-connection herein described, consisting of the spindle 3, externally screw-threaded, having the annular collar $c$ on its lower end, combined with the nut 7, having a screw engagement with the spindle above said collar, and the valve 6, having an annular chamber, $v$, in one side to receive the lower end of said spindle and collar, said chamber having an overhanging border, $b$, surrounding an opening of suitable diameter to receive the neck $e$ of said nut, and a passage through its side of a width less than the diameter of said neck, substantially as set forth.

H. R. FRISBIE.

Witnesses:
A. F. ALBERTSON,
J. W. CROSS.